(12) United States Patent
Li et al.

(10) Patent No.: US 12,447,212 B2
(45) Date of Patent: Oct. 21, 2025

(54) STARCH-BASED CARRIER MATERIAL WITH M CELL TARGETING PERFORMANCE AND PH RESPONSIVENESS, AND PREPARATION METHOD THEREFOR AND USE THEREOF

(71) Applicant: SOUTH CHINA UNIVERSITY OF TECHNOLOGY, Guangdong (CN)

(72) Inventors: Xiaoxi Li, Guangzhou (CN); Yiping Zhang, Guangzhou (CN); Ling Chen, Guangzhou (CN); Lin Li, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 901 days.

(21) Appl. No.: 17/621,728

(22) PCT Filed: Nov. 28, 2019

(86) PCT No.: PCT/CN2019/121423
§ 371 (c)(1),
(2) Date: Dec. 22, 2021

(87) PCT Pub. No.: WO2020/258713
PCT Pub. Date: Dec. 30, 2020

(65) Prior Publication Data
US 2022/0249677 A1 Aug. 11, 2022

(30) Foreign Application Priority Data
Jun. 28, 2019 (CN) .......................... 201910575882.7

(51) Int. Cl.
*A61K 47/61* (2017.01)
*C08B 31/12* (2006.01)

(52) U.S. Cl.
CPC ............ *A61K 47/61* (2017.08); *C08B 31/125* (2013.01)

(58) Field of Classification Search
None
See application file for complete search history.

(56) References Cited

FOREIGN PATENT DOCUMENTS

| CN | 102688498 A | 9/2012 |
|---|---|---|
| CN | 103341179 A | 10/2013 |
| CN | 104159573 A | 11/2014 |
| CN | 106581686 A | 4/2017 |
| CN | 110256585 A | 9/2019 |

OTHER PUBLICATIONS

Osth et al., Journal of Drug Targeting (2003), 11(1), pp. 75-82.*
Larhed et al., Journal of Drug Targeting (2004), 12(5), pp. 289-296.*
Assaad et al "The influence of protonation ratio on properties of carboxymethyl starch excipient at various substitution degrees: Structural insights and drug release kinetics" Int J Pharm. 2010;394(1-2):75-84.
Dong-Yi et al "Oral gavage delivery of PR8 antigen with # glucan conjugated GRGDS carrier to enhance M-cell targeting ability and induce immunity", Biomacromolecules, Mar. 9, 2017.

* cited by examiner

*Primary Examiner* — Brian J Davis
(74) *Attorney, Agent, or Firm* — JMB Davis Ben-David (57) ABSTRACT

Disclosed are a M-cell targeting and pH-responsive starch-based carrier material, and a preparation method and application thereof. The starch-based carrier material has a molecular structure as follows, a molecular weight of $7.04 \times 10^4$ to $2.11 \times 10^6$ g/mol, a degree of substitution of carboxymethyl groups of 0.04 to 0.28, and a grafting amount of targeting peptide GRGDS of 0.01% to 1.12% (calculated based on the content of N). The material is not dissolved in water when protonated at pH (pH=1.2) of the stomach, and is slowly dissolved in water when deprotonated at pH (pH=6.8) of the small intestine, therefore it has good responsiveness to pH of the gastrointestinal tract. The material can efficiently encapsulate a positively charged active substance by means of electrostatic interaction, therefore it can protect the active substances from being destroyed and inactivated in the gastrointestinal tract. Meanwhile, the material can target M cells to improve the transport efficiency of the active substance by M cells, thereby improving the bioavailability of the active substance.

10 Claims, 5 Drawing Sheets

STARCH-BASED CARRIER MATERIAL WITH M CELL TARGETING PERFORMANCE AND PH RESPONSIVENESS, AND PREPARATION METHOD THEREFOR AND USE THEREOF

CROSS-REFERENCE TO RELATED APPLICATIONS

This is the U.S. National Stage of International Patent Application No. PCT/CN2019/121423 filed on Nov. 28, 2019, which in turn claims the benefit of Chinese Patent Application No. 201910575882.7 filed on Jun. 28, 2019.

FIELD OF THE INVENTION

The present invention relates to a starch-based carrier material, and in particular, to an M-cell targeting and pH-responsive starch-based carrier material, and a preparation method and application thereof.

BACKGROUND OF THE INVENTION

The mucosal immune system, the largest component of the entire immune system, is the first line of defense for the human immunity system, and contains about three quarters of immune cells, among which M cells act as a main gateway for mucosa to uptake and capture antigens. M cells are mainly located in the follicle-associated epithelium (FAE) of the Peyer's patches, and closely arranged with enterocytes to form irregular microvilli on the intestinal epithelium, which helps the intestinal epithelium to absorb antigenic substances from the intestinal lumen of the upper gastrointestinal tract. There are a lot of pinocytotic vesicles and mitochondria in the cytoplasm of M cells, but a few of lysozymes. Membranous folds are formed on the apical surfaces of M cells, with the basolateral surfaces invaginated into a pocket containing T cells, B cells, and macrophagocytes etc. This structure shortens the pathway to cross the M epithelium for pinocytosis vesicles containing antigen, which benefit the rapid migration of the antigen in subcutaneous lymphoid tissues to stimulate mucosal immune response. In addition, M cells transport a wide range of substances, including bacteria, viruses, antigens, and particles. Because a few of M cells are distributed in the intestine, specific targeting M cells can enhance the absorption and transport of immune substance particles by M cells. Studies have shown that targeted delivery of antigens to M cells can increase the amount of antigen uptake in Peyer's patches and activate more T cells and B cells to participate in immune responses.

As people pay more and more attention to nutrition and health, in addition to obtaining basic nutrients through food, people also consume a large amount of active substances having nutritional functions, such as functional proteins and peptide, polysaccharides and oligosaccharides, lipids and fatty acids, probiotics, polyphenols and the like, to improve the health themselves. However, free functional active substances are susceptible to physical, chemical, and physiological barriers in the gastrointestinal tract during oral delivery, therefore they cannot effectively initiate mucosal immune responses. In addition, the frequent swing of cilia of the local mucosa, and the presence of the large amount of hydrolytic enzymes in the local mucosal also cause rapid degradation and inactivation of foreign immune substances, making it difficult to induce mucosal immune responses by antigens inoculated to the mucosal. Meanwhile, a few of M cells are distributed in the intestinal tract, most of delivery systems pass through the mucosal layer mainly by random phagocytosis of epithelial cells of the mucosa, and cannot effectively initiate mucosal immune responses. Therefore, a carrier capable of actively targeting M cells is required. On one hand, the carrier can deliver immune substances such as antigens to the intestinal mucosa, and protect the immune substances from being destroyed by the gastrointestinal tract environment and local mucosal environment. On the other hand, the carrier can target M cells, improve the absorption and transport efficiency of the immune substances by M cells, and enhance mucosal immune responses.

There are a variety of specific recognition receptors on the surfaces of M cells, such as protein peptides, glycoproteins, and phospholipids. The transport efficiency of polymer particles by M cells can be improved by selecting suitable ligands to perform targeted modifications on polymers. According to Garinot et al., PEGylated PLGA-based nanoparticles targeting M cells for oral vaccination (Journal of Controlled Release, 2007, 120(3): 195-204), RGD peptide is covalently bound to PEG of polycaprolactone modified with polyethylene glycol (PEG) (PCL-PEG) by means of a photografting technique, to synthesize a PCL-PEG amphiphilic copolymer capable of targeting M cells and grafted with RGD oligopeptide on surface, and the amphiphilic copolymer enhances the transport efficiency of target functional proteins by M cells through encapsulating the target functional proteins by oil-in-water and then water-in-oil methods. However, due to the high water solubility and water absorption of PEG molecules per se, they can improve drug release capabilities of tablets, making it difficult to realize controlled slow release of drug. PEG molecules can change structures of biomembranes of various cells, and will damage cells to a certain extent. In addition, the grafting degree of RGD is lower, and the content of N element is only 0.16% after grafting. According to Yoo et al., (Yoo M K, Kang S K, Choi J H, et al., Targeted delivery of chitosan nanoparticles to Peyer's patch using M cell-homing peptide selected by phage display technique [J]. Biomaterials, 2010, 31(30): 7738-7747.), a chitosan carrier material having a function of targeting M cells is prepared by using M-cell targeting peptide (with an amino acid sequence of CKSTHPLSC) and chitosan by means of a method of ionic gel. However, according to studies of the document, chitosan is easily dissolved in an acidic environment, which is not beneficial to the protection of functional activities of active substances in the gastrointestinal tract. According to Lee et al., Oral Gavage Delivery of PR8 Antigen with β-Glucan-Conjugated GRGDS Carrier to Enhance M-Cell Targeting Ability and Induce Immunity (Biomacromolecules, 2017, 18(4): 1172-1179), M-cell targeting peptide GRGDS is grafted onto cationic β-glucan by means of an acylation reaction, and antigens PR8 are encapsulated to form nanoparticles that can well target M cells, but studies on the controlled release of the antigens in the gastrointestinal tract during oral delivery are not available.

At present, studies on carrier systems for targeting M cells mainly focus on functions of targeting M cells, but there are few studies on whether M-cell targeting carrier materials can protect immunoreactive substances from being released and inactivated in the physiological environment of the gastrointestinal tract. In addition, most of the carrier materials are selected from artificially synthesized high molecular materials, which have potential hazards; besides, natural high molecular carrier materials are mainly chitosan, which are not conductive to the controlled release of immunoreactive substances in the gastrointestinal tract due to the solubility of the materials themselves. Therefore, in order to achieve M-cell targeting of oral immunoreactive substances and further improve the bioavailability of the oral immunologic active substances, M-cell carrier materials need to have the following features: (1) good encapsulation effects on the immunoreactive substances, and capability of forming a stable delivery system with the active substances; (2) capability of resistance to strong acids, pH changes, and enzyme hydrolysis in the physiological environment of the gastrointestinal tract so as to achieve the controlled release of the active substances in the gastrointestinal tract environment; and (3) M-cell targeting function: realizing the function of targeting M cells by the recognition of specific receptors on the surfaces of M cells, and improving the transport efficiency of the active substances by M cells.

Starch is a kind of polysaccharide widely existing in nature, which is non-toxic, biodegradable, and biocompatible. Studies have shown that starch-based carrier materials have good bioadhesion, which can prolong the detention time of a drug delivery system at a specific position of the biomembrane, and facilitate the adsorption and transport of the drug delivery system by immune cells of the mucosa. The present invention is directed to overcome the above defects and deficiencies in the prior art, and develop an M-cell targeting and pH-responsive starch-based carrier material.

SUMMARY OF THE INVENTION

In order to overcome the defects and deficiencies in the prior art, a primary objective of the present invention is to provide an M-cell targeting and pH-responsive starch-based carrier material. The starch-based carrier material not only targets M cells well, but also has the characteristics of good responsivity to pH in the gastrointestinal tract, certain resistance to enzymolysis, high carrying capacity, etc.

Another objective of the present invention is to provide a preparation method of the M-cell targeting and pH-responsive starch-based carrier material described above.

Still another objective of the present invention is to provide an application of the M-cell targeting and pH-responsive starch-based carrier material described above.

The objectives of the present invention are achieved by the following technical solutions.

An M-cell targeting and pH-responsive starch-based carrier material has a molecular structure as follows:

the M-cell targeting and pH-responsive starch-based carrier material has a molecular weight of $7.04 \times 10^4$ to $2.11 \times 10^6$ g/mol, a degree of substitution of carboxymethyl groups of 0.04 to 0.28, and a grafting amount of targeting peptide GRGDS of 0.01% to 1.12% (calculated based on the content of N element).

That the R is H or $R_1$ or $R_2$ does not represent the case that in the molecular structure, all the Rs are H at the same time, or all the Rs are $R_1$ at the same time, or all the Rs are $R_2$ at the same time, but represents that in the molecular structure of the M-cell targeting and pH-responsive starch-based carrier material, among multiple Rs, some are H, some are $R_1$, and some are $R_2$.

A preparation method of the M-cell targeting and pH-responsive starch-based carrier material described above includes the following steps:

(1) taking a starch as a raw material to prepare a carboxymethyl starch by means of an etherification reaction with monochloro acetic acid; and (2) taking the carboxymethyl starch as a raw material, grafting a GRGDS oligopeptide onto the molecular chain of the carboxymethyl starch by means of an acylation reaction, removing unreacted catalyst and oligopeptide by means of dialysis after the reaction is completed, and performing freeze-drying, to obtain a starch-based carrier material having a M-cell targeting function.

In the step (1), the molecular weight of the starch is $1.0 \times 10^6$ to $1.0 \times 10^7$ g/mol.

In the step (1), the etherification reaction is carried out at 40 to 50° C. for 2 to 4 h; and a molar ratio of the starch to the monochloro acetic acid is 1:(0.1-0.4).

In the step (2), the degree of substitution of the carboxymethyl starch is 0.04 to 0.27.

In the step (2), the acylation reaction is carried out at 25 to 35° C. for 12 to 24 h in the presence of a catalyst, and the catalyst is a mixture of 1-ethyl-(3-dimethylaminopropyl) carbodiimide (EDC) and N-hydroxy succinimide (NHS), preferably the mixture of 1-ethyl-(3-dimethylaminopropyl) carbodiimide (EDC) and N-hydroxy succinimide (NHS) in a molar ratio of 1:1.

In the step (2), usage amounts of the carboxymethyl starch, the catalyst, and the GRGDS oligopeptide satisfy the following conditions: calculated based on a molar weight, a ratio of the carboxymethyl starch to the catalyst to the GRGDS oligopeptide is (1:1:1) to (4:1:1) (in the catalyst, a molar ratio of EDS to NHS is 1:1).

In the step (2), a concentration of the carboxymethyl starch in the acylation reaction system is 0.5 to 2% (w/v) (g/mL), and a solvent is a phosphate buffer solution (0.1 M, pH=7.5).

After the reaction of the step (1) is completed, the carboxymethyl starch may be further subjected to enzymolysis, enzyme denaturalixation, and freeze-drying, and then used as the raw material for the acylation reaction of the step (2).

The enzymolysis represents that the carboxymethyl starch is first subjected to pullulanase enzymolysis, and then subjected to high-temperature stable α-amylase enzymolysis, the pullulanase enzymolysis is carried out at unit enzyme activity of 15 U/g (the carboxymethyl starch in dry basis) and 50° C. for 16 to 24 h; and the high-temperature stable α-amylase enzymolysis is carried out at unit enzyme activity of 100 U/g (the carboxymethyl starch in dry basis) and 80° C. for 10 to 30 min.

An application of the M-cell targeting and pH-responsive starch-based carrier material described above in preparation of an oral preparation is provided.

An active substance in the oral preparation is preferably a positively charged immunoreactive substance.

Compared with the prior art, the present invention has the following advantages and beneficial effects.

(1) The preparation method of the M-cell targeting and pH-responsive starch-based carrier material according to the present invention is easy to operate, requires mild reaction conditions, and has high controllability.

(2) The M-cell targeting and pH-responsive starch-based carrier material according to the present invention is not dissolved in water when protonated at a condition of pH (pH=1.2) of the stomach, and is slowly dissolved in water when deprotonated at a condition of pH (pH=6.8) of the small intestine, therefore it has good responsiveness to pH of the gastrointestinal tract. The material can efficiently encapsulate the positively charged active substance by means of electrostatic interaction, therefore it can better protect the active substance from being destroyed and inactivated in the gastrointestinal tract. Meanwhile, the material can target M cells to improve the transport efficiency of the active substance by M cells, thereby improving the bioavailability of the active substance.

(3) The M-cell targeting and pH-responsive starch-based carrier material according to the present invention can be specifically recognized by and bound to M cells via the grafted M-cell targeting peptide GRGDS, which facilitates improving the bioavailability of the active substance by M cells, thereby enhancing immune responses.

(4) The M-cell targeting and pH-responsive starch-based carrier material according to the present invention can regulate a controlled release effect in the gastrointestinal tract and the M-cell targeting capability of the carrier material, by regulating the degree of substitution of carboxymethyl groups and the grafting amount of M-cell targeting peptide GRGDS, so as to be applicable to immunological functions of different oral active substances.

DETAILED DESCRIPTION OF THE EMBODIMENTS

The present invention will be further described in detail below with reference to examples and the drawings, but the present invention is not limited thereto.

Unless otherwise specified, reagents used in the examples are commercially available. Wherein, GRGDS oligopeptide was purchased from GL Biochem Co., Ltd., and chicken ovalbumin (OVA) was purchased from Sigma Reagents Co., Ltd. Experimental cells were human colorectal cancer cells Caco-2 cells (ATCC: HTB37) and human lymphoma cells Raji B cells (ATCC: CCL-86), which were both purchased from China Center for Type Culture Collection (CCTCC).

In the examples, the ζ-potential was tested with reference to "Zhang Y, Chi C, Huang X, et al. Starch-based nanocapsules fabricated through layer-by-layer assembly for oral delivery of protein to lower gastrointestinal tract [J]. Carbohydrate polymers, 2017, 171: 242-251". Specific conditions for testing were as follows: the concentration of a sample was 5 mg/mL, solvents were phosphate buffer solutions (0.01 M) with different pH values, a nano laser particle size analyzer (purchased from Malvern Instruments Co., Ltd., UK) was used for testing, the testing temperature was 25° C., the testing was carried out for 3 times, equilibration time was 2 min, and the equilibration temperature was 25° C.

The cytotoxicity of starch-based carrier materials in the Examples was tested with reference to "He B, Lin P, Jia Z, et al. The transport mechanisms of polymer nanoparticles in Caco-2 epithelial cells [J]. Biomaterials, 2013, 34(25): 6082-6098". Specifically, Caco-2 cells were formulated into single cell suspensions with DMEM media containing 10% fetal calf serum, inoculated into a 96-well plate at a density of $1\times10^3$ cells/well, and cultured at 37° C. for 24 h, and original media were removed. 10 μL of starch-based carrier material solution was added into each well (with a solvent of a DMEM culture solution containing 10% fetal calf serum, 0.1 M, pH=7.4), and the cells were cultured at 37° C. for 24 h. 10 μL of CCK-8 reagent (purchased from Beyotime Biotechnology Co., Ltd.) was added into each well, the cells were cultured at 37° C. for 4 h, and the absorbance of each well was detected at a wavelength of 450 nm by using an enzyme immunodetector. Control wells were not added with the starch-based carrier material solution, and blank wells were not added with the cells and the starch-based carrier material solution. The cytotoxicity was calculated as follows:

$$\text{Survival rate of cells (\%)} = \frac{A_s - A_b}{A_c - A_b} \times 100\%$$

wherein, $A_s$ is the absorbance of an experimental well, Ab is the absorbance of the blank well, and $A_c$ is the absorbance of the control well.

An in vitro model of M cells was constructed by co-culturing Raji B cells with Caco-2 cells with reference to "des Rieux A, Fievez V, Théate I, et al. An improved in vitro model of human intestinal follicle-associated epithelium to study nanoparticle transport by M cells [J]. European journal of pharmaceutical sciences, 2007, 30(5): 380-391". Specifically, Caco-2 cells in the logarithmic growth phase were selected, digested with 0.25% trypsins, subjected to aseptic centrifugation (at 800 rpm/min for 3 min), and resuspended with a high-glucose DMEM medium (containing 10% bovine serum and 1% non-essential amino acid) into a Caco-2 cell suspension at $1\times10^6$ cells/mL. The Caco-2 cell suspension were seeded on the upper side of a filter membrane at the bottom of a 12-well polycarbonate Transwell inserts (purchased from Corning, USA, 3 with a surface area of the filter membrane of 1.12 cm$^2$) at 0.5 mL/well, and the cells were cultured at 37° C. under the conditions of 5% $CO_2$ and saturated water vapor for 14 days. During the culture, 0.5 mL of high-glucose DMEM medium was added into an inner inserts (above the filter membrane), 1 mL of high-glucose DMEM medium was added at a basolateral side (below the filter membrane) of the inserts, and the medium were replaced every two days. After the monolayer culture was completed, the resistance of monolayer cells was detected by using a transmembrane cell resistor, and the cells with the cell resistance of greater than 300 Ω/cm in the loculus were selected for further co-culture. During the co-culture, Raji B cells in the logarithmic growth phase were selected and dispersed using a mixed medium with DMEM/RPMI 1640=2:1 into a cell suspension at $5\times10^5$ cells/mL, and the cell suspension was added into the basolateral side of the inserts at 1 mL/well for co-culture. During the co-culture, 0.5 mL of DMEM/RPMI 1640 mixed medium was added into the inserts, 1.5 mL of mixed medium was added into the basolateral side of the inserts, the media were replaced every day, after the co-culture was carried out for 4 to 5 days, a layer of cellular monomolecular layer distributed with M cells and Caco-2 cells was formed on the upper side of the filter membrane at the bottom of the Transwell inserts.

M-cell targeting of the starch-based carrier material was observed by using a laser scanning confocal microscope with reference to "des Rieux A, Fievez V, Théate I, et al. An improved in vitro model of human intestinal follicle-associated epithelium to study nanoparticle transport by M cells [J]. European journal of pharmaceutical sciences, 2007, 30(5): 380-391". Specifically, a starch-based carrier material solution was added onto the filter membrane at the bottom of the above-mentioned Transwell inserts with the cellular monomolecular layer containing M cells and Caco-2 cells, and M-cell targeting of the starch-based carrier material was observed by using a laser scanning confocal microscope. Before the experiment, firstly, the starch-based carrier material was fluorescently labeled with cationic fluorescent nanoparticles (purchased from Thermo Fisher Scientific, INC), the fluorescently-labeled sample was diluted with a DMEM (2% FBS) culture solution to a sample concentration of $1.5\times10^5$ particles/mL and equilibrated at 37° C. for a period of time, 0.5 mL of sample was added into the upper insert side of the Transwell inserts with the constructed cellular monomolecular layer containing M cells and Caco-2 cells, and 1.5 mL of DMEM (2% FBS) culture solution was added into the basolateral compartment of the inserts. The culture plate was placed in an incubator at 37° C. and containing 5% $CO_2$ and incubated for 4 h, the media were removed, the filter membrane at the bottom of the upper insert side of the Transwell plate well was washed with PBS, 4% paraformaldehyde solution was added to fix Caco-2 cells and M cells for 15 min, the paraformaldehyde was removed after the fixing, the cells were washed with PBS at low temperature, and a monoclonal antibody (NKM 16-2-4) solution (purchased from Medical & Biological Laboratories Co., LTD) of M cells was added to treat the cells at 4° C. for 24 h. After the treatment was completed, the cells were washed with PBS, and corresponding secondary antibodies (Anti rat IgG-488) (purchased from Jackson ImmunoResearch Laboratories, INC.) were added to treat the cells at 37° C. for 1 h. After the treatment was completed, the cells were washed to be clean with PBS, and a Hoechst 33342 staining reagent was finally added to dye all cell nuclei for 2 min. After the cells were washed with PBS, the filter membrane of the inserts was stripped off, placed on a slide, covered with a cover glass, and detected by using a laser scanning confocal microscope to observe M-cell targeting of the starch-based carrier material. If fluorescent positions of the starch-based carrier material and M cells that are fluorescently labeled differently are overlapped, it can be determined that the starch-based carrier material targets M cells.

An M-cell targeting transport experiment was carried out by means of a method with reference to "Garinot M, Fiévez V, Pourcelle V, et al. PEGylated PLGA-based nanoparticles targeting M cells for oral vaccination [J]. Journal of Controlled Release, 2007, 120(3): 195-204" and being slightly modified. Specifically, the M-cell targeting transport experiment was performed on the filter membrane at the bottom of the above-mentioned Transwell inserts with the cellular monomolecular layer containing M cells and Caco-2 cells. Firstly, the starch-based carrier material was fluorescently labeled with cationic fluorescent nanoparticles (purchased from Thermo Fisher Scientific Inc.), the fluorescently labeled sample was diluted with a DMEM (2% FBS) culture solution to a sample concentration of $1.5×10^5$ particles/mL and equilibrate at 37° C. for a period of time, 0.5 mL of the sample was added into the upper insert side of the Transwell inserts with the constructed cellular monomolecular layer containing M cells and Caco-2 cells, and 1.5 mL of DMEM (2% FBS) culture solution was added into the basolateral compartment of the inserts. The culture plate was placed in an incubator at 37° C. and containing 5% $CO_2$ and incubated for 4 h, the fluorescently labeled starch-based carrier material subjected to M-cell targeting transport entered the culture solution in the basolateral compartment of the inserts. The number of fluorescent particles of the fluorescently-labeled starch-based carrier material in the culture solution in the basolateral compartment of the inserts was measured, and the transport efficiency of the starch-based carrier material by M cells can be calculated by the following formula. The transport efficiency was calculated as follows:

$$\text{Transport efficiency} = \frac{dQ}{dtAC_0}$$

wherein, dQ/dt is the number (particles/s) of the fluorescently-labeled starch-based carrier material transported to the basolateral compartment of the inserts within unit time, A is the area ($cm^2$) of the cellular monomolecular layer in the Transwell plate, and $C_0$ is the initial concentration (particles/mL) of the fluorescently-labeled starch-based carrier material diluent added into the upper insert side.

In vitro simulated release of target proteins (OVA) by the starch-based carrier material was carried out with reference to "Zhang Y, Chi C, Huang X, et al. Starch-based nanocapsules fabricated through layer-by-layer assembly for oral delivery of protein to lower gastrointestinal tract [J]. Carbohydrate polymers, 2017, 171: 242-251". Specifically, assembled micro-capsules obtained by encapsulating OVA with the starch-based carrier material were placed into 150 mL of simulated gastric fluid for 2 h, 2 mL of sample was taken and centrifuged (at 10,000 rpm/min for 10 min) immediately, a supernatant was taken, the content of OVA was measured, and a release rate was calculated; then, the assembled micro-capsules were separated from the simulated gastric fluid by means of centrifugation (at 10,000 rpm/min for 10 min) and placed into 150 mL of simulated small intestinal fluid, 2 mL of sample was taken and centrifuged (at 10,000 rpm/min for 10 min) immediately, a supernatant was taken, the content of OVA was measured, and a release rate was calculated. The parameters of a dissolution tester were set as follows: a distance between a bottom of a paddle and an inner bottom of a dissolution cup was 25±2 mm, the temperature was 37° C., and a rotation rate was 75 rpm.

Simulated gastric fluid: 7 mL of concentrated HCl was taken and dissolved in a small amount of water, and after being uniformly shaken in a beaker, the mixture was transferred into a 1 L volumetric flask and subjected to constant volume processing with double distilled water.

Simulated small intestinal fluid: 6.8 g of $KH_2PO_4$ was weighed and dissolved in a certain amount of water, a pH value of the solution was titrated to 6.8 by dropwise adding a NaOH alkaline solution, a small amount of aqueous solution of pancreatin (purchased from Singma-Aldrich Scientifics company) (10 g) was added into the mixture, and the mixture was transferred into a 1 L volumetric flask and subjected to constant volume processing with double distilled water.

Example 1

(1) An etherification reaction was carried out in a molar ratio of monochloro acetic acid to native starch (with a molecular weight of $2.0×10^6$ g/mol) of 0.4 at 50° C. for 4 h, to prepare a carboxymethyl starch (abbreviated as CMS1) with a degree of substitution of carboxymethyl groups of 0.27; and (2) an acylation reaction was carried out in a molar ratio of carboxymethyl groups to a catalyst to a GRGDS oligopeptide of 1:1:1 at 35° C. for 24 h, wherein the catalyst was a mixture of EDC and NHS (in a molar ratio of 1:1), the concentration of the carboxymethyl starch in the reaction system was 1% (w/v, g/mL), and a solvent was a phosphate buffer solution (0.1 M, pH=7.5). After the reaction was completed, the mixture was subjected to dialysis and freeze-drying to obtain a starch-based carrier material (RGD-CMS1) with a molecular weight of $2.11×10^6$ g/mol, the degree of substitution of carboxymethyl groups of 0.27, and a grafting amount of the targeting peptide GRGDS of 1.12% (calculated based on the content of N element).

Figure 1:
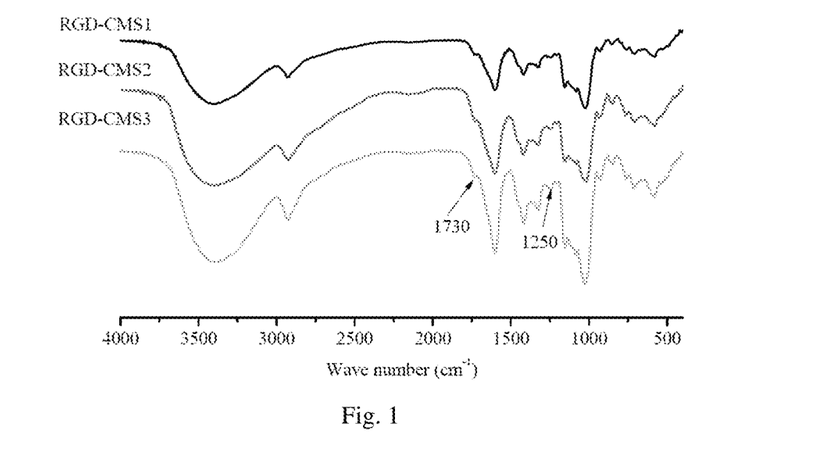
FIG. 1 is infrared spectrograms of the starch-based carrier materials prepared in Examples 1 to 3.
Figure 2:
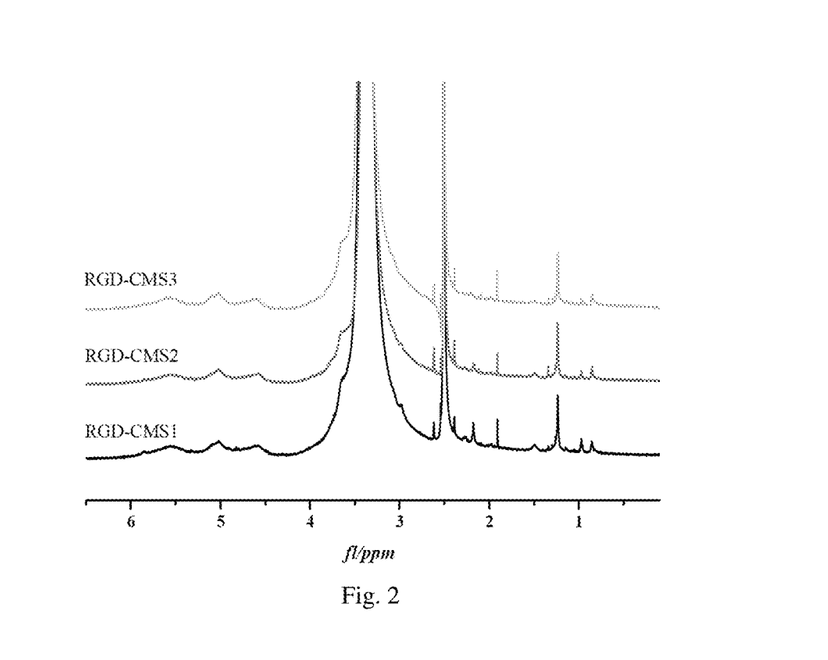
FIG. 2 is proton nuclear magnetic resonance spectrograms of the starch-based carrier materials prepared in Examples 1 to 3.

An infrared spectrogram and a proton nuclear magnetic resonance spectrogram of the starch-based carrier material (RGD-CMS1) prepared in the present example are respectively shown as FIG. 1 and FIG. 2. In the infrared spectrogram (FIG. 1) of RGD-CMS1, there appear two new absorption peaks respectively at 1730 $cm^{-1}$ and 1250 $cm^{-1}$, namely an absorption peak within the amide I band and an absorption peak within the amide III band, which proves that RGD-CMS1 has amido bonds. In the proton nuclear magnetic resonance spectrogram (FIG. 2) of RGD-CMS1, new chemical shifts respectively appear at 1.63 ppm, 2.84 ppm, and 3.56 ppm, and are respectively proton chemical shifts of methylene (—$CH_2$—) on arginine molecules, methine (—$CH_2$—CH(COOH)—$CH_2$—) on aspartic acid molecules, and methylene (—$CH_2$—) on glycine molecules, which proves that the RGD oligopeptide is successfully grafted onto CMS molecules.

Figure 3:
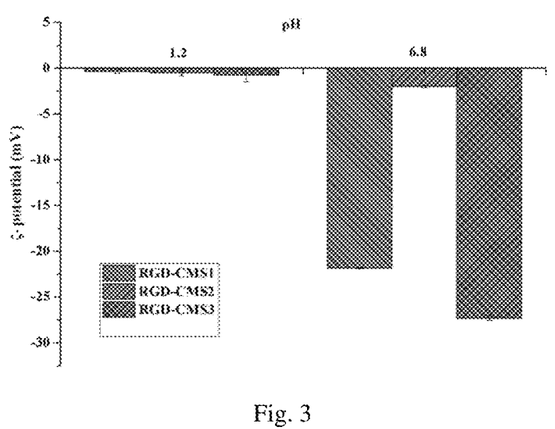
FIG. 3 is ζ-potential diagrams of the starch-based carrier materials prepared in Examples 1 to 3 at different pH conditions.

RGD-CMS1 was negatively charged, hardly charged when protonated at pH (1.2) of the stomach, and had a ζ-potential of −21.85 mV when deprotonated at pH (6.8) of the small intestine (results are shown as FIG. 3).

Figure 4:
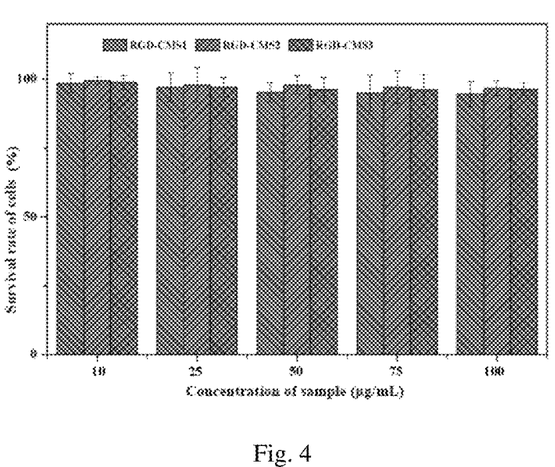
FIG. 4 is cytotoxicity diagrams of the starch-based carrier materials prepared in Examples 1 to 3.

After RGD-CMS1 was co-cultured with Caco-2 cells, survival rates of Caco-2 cells were all 95% or more at all experimental concentrations (10 to 100 μg/mL) (results are shown as FIG. 4), which proves that the starch-based carrier material is safe and non-toxic.

Figure 5:
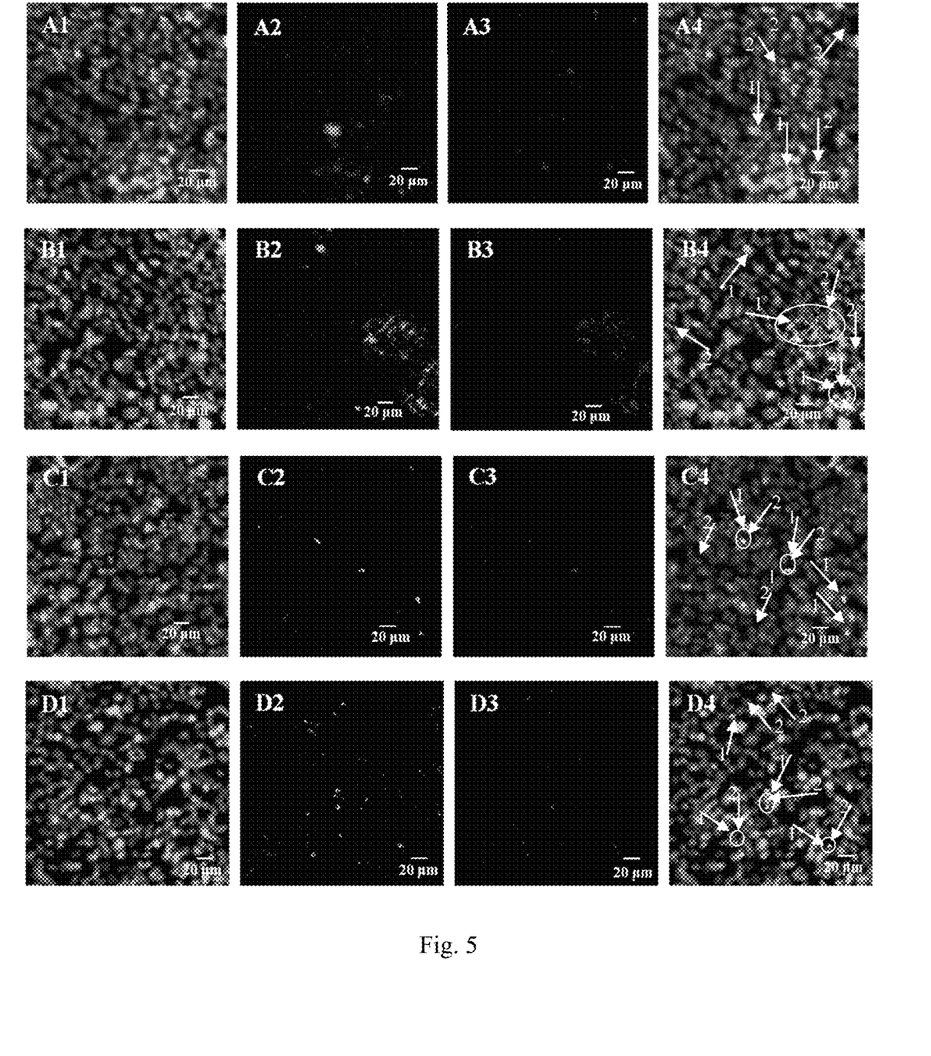
FIG. 5 is laser scanning confocal micrographs of the starch-based carrier materials prepared in Examples 1 to 3 that are co-cultured with a cellular monomolecular layer composed of M cells and Caco-2 cells.

A carboxymethyl starch without grafted peptide and the starch-based carrier material RGD-CMS1 were respectively co-cultured with Caco-2 cells and M cells in the cellular monomolecular layer on the upper side of the filter membrane at the bottom of the Transwell inserts. Results are shown as FIG. 5, wherein A1 to A4 are laser scanning confocal micrographs of the carboxymethyl starch without grafted peptide co-cultured with M cells and Caco-2 cells, and B1 to B4 are laser scanning confocal micrographs of the starch-based carrier material RGD-CMS1 co-cultured with Caco-2 cells and M cells. In FIG. 5, A1 and B1 are cell nuclei (bright spots in the figures) of Caco-2 cells and M cells in the cellular monomolecular layer on the upper side of the filter membrane at the bottom of the Transwell inserts; A2 and B2 are M cells (labeled with specific antibodies of M cells and observed, bright spots in the figures) in the cellular monomolecular layer; A3 and B3 respectively are the fluorescently-labeled carboxymethyl starch without grafted peptide and the fluorescently-labeled starch-based carrier material RGD-CMS1 (bright spots in the figures); and A4 and B4 are respectively merged graphs of each previous 3 graphs. It can be seen from A4 that fluorescent positions (positions of different arrows in the figure) of the carboxymethyl starch without grafted peptide and M cells are not overlapped and dispersed, which indicates that the carboxymethyl starch without grafted peptide does not target M cells. However, it can be seen from B4 that fluorescent positions of the starch-based carrier material RGD-CMS1 and the M cells in the cellular monomolecular layer on the upper side of the filter membrane at the bottom of the Transwell inserts are overlapped in a large area (in the figure, arrows 1 point to M cells, arrows 2 point to the fluorescently-labeled starch-based carrier material, and overlapping parts of M cells and the starch-based carrier material are marked with circles), which indicates that the starch-based carrier material RGD-CMS1 targets M cells well.

Figure 6:
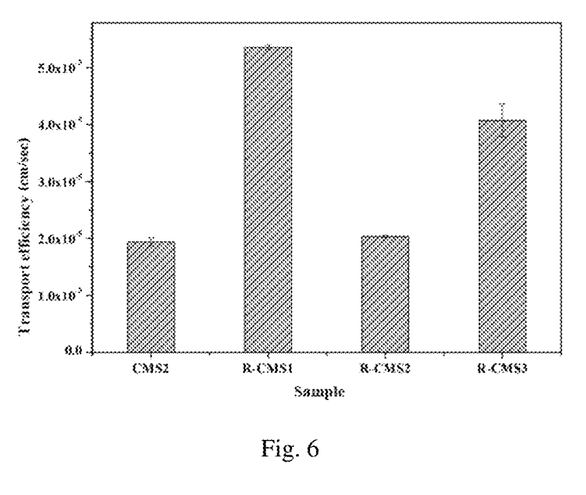
FIG. 6 is diagrams of the transport efficiency of the starch-based carrier materials prepared in Examples 1 to 3 by M cells.

The transport efficiency of the starch-based carrier material by M cells before and after the targeting peptide is grafted is shown as FIG. 6, and it can be seen from the figure that the transport efficiency of RGD-CMS1 (abbreviated as R-CMS1 in the figure) by M cells is increased by 2.75 times compared with that of the carboxymethyl starch obtained in the step (1).

Example 2

(1) An etherification reaction was carried out in a molar ratio of monochloro acetic acid to native starch (with a molecular weight of $1.0 \times 10^6$ g/mol) of 0.1 at 40° C. for 2 h, to prepare a carboxymethyl starch with a degree of substitution of carboxymethyl groups of 0.04;

(2) the carboxymethyl starch with the degree of substitution of carboxymethyl groups of 0.04 prepared in the step (1) was first subjected to pullulanase (with unit enzyme activity of 15 U/g (carboxymethyl starch in dry basis)) enzymolysis at 50° C. for 24 h, and then subjected to high-temperature resistant α-amylase (with unit enzyme activity of 100 U/g (carboxymethyl starch in dry basis)) enzymolysis at 80° C. for 30 min to obtain a carboxymethyl starch (CMS2) with a molecular weight of $6.99 \times 10^4$ g/mol; and (3) an acylation reaction was carried out in a molar ratio of carboxymethyl groups to a catalyst to a GRGDS oligopeptide of 4:1:1 at 25° C. for 12 h, wherein the catalyst was a mixture of EDC and NHS (in a molar ratio of 1:1), the concentration of the carboxymethyl starch in the reaction system was 0.5% (w/v, g/mL), and a solvent was a phosphate buffer solution (0.1 M, pH=7.5). After the reaction was completed, the mixture was subjected to dialysis and freeze-drying to obtain a starch-based carrier material (RGD-CMS2) with a molecular weight of $7.04 \times 10^4$ g/mol, a degree of substitution of carboxymethyl groups of 0.04, and a grafting amount of the targeting peptide GRGDS of 0.01% (calculated based on the content of N element).

An infrared spectrogram and a proton nuclear magnetic resonance spectrogram of the starch-based carrier material (RGD-CMS2) prepared in the present example are respectively shown as FIG. 1 and FIG. 2. In the infrared spectrogram (FIG. 1) of RGD-CMS2, there appear two new absorption peaks respectively at 1730 $cm^{-1}$ and 1250 $cm^{-1}$, namely an absorption peak within the amide I band and an absorption peak within the amide III band, which proves that RGD-CMS2 has amido bonds. In the proton nuclear magnetic resonance spectrogram (FIG. 2) of RGD-CMS2, new chemical shifts respectively appear at 1.63 ppm, 2.84 ppm, and 3.56 ppm, and are respectively proton chemical shifts of methylene (—$CH_2$—) on arginine molecules, methine (—$CH_2$—CH(COOH)—$CH_2$—) on aspartic acid molecules, and methylene (—$CH_2$—) on glycine molecules, which proves that the RGD oligopeptide is successfully grafted onto CMS molecules.

RGD-CMS2 was negatively charged, hardly charged when protonated at pH (1.2) of the stomach, and had a ζ-potential of −1.98 mV when deprotonated at pH (6.8) of the small intestine (results are shown as FIG. 3).

After RGD-CMS2 was co-cultured with Caco-2 cells, survival rates of Caco-2 cells were all 95% or more at all experimental concentrations (10 to 100 μg/mL) (results are shown as FIG. 4), which proves that the starch-based carrier material is safe and non-toxic.

The starch-based carrier material RGD-CMS2 was co-cultured with Caco-2 cells and M cells in the cellular monomolecular layer on the upper side of the filter membrane at the bottom of the Transwell inserts. Results are shown as FIG. 5, wherein C1 is cell nuclei (bright spots in the figure) of Caco-2 cells and M cells in the cellular monomolecular layer on the upper side of the filter membrane at the bottom of the Transwell inserts; C2 is M cells (labeled with specific antibodies of M cells and observed, bright spots in the figure) in the cellular monomolecular layer; C3 is the fluorescently-labeled starch-based carrier material RGD-CMS2 (bright spots in the figure); and C4 is a merged graph of each previous 3 graphs. It can be seen from C4 that fluorescent positions of the starch-based carrier material RGD-CMS2 and M cells in the cellular monomolecular layer on the upper side of the filter membrane at the bottom of the Transwell inserts are partially overlapped (in the figure, arrows 1 point to M cells, arrows 2 point to the fluorescently-labeled starch-based carrier material, and overlapping parts of M cells and the starch-based carrier material are marked with circles), which indicates that the starch-based carrier material RGD-CMS2 targets M cells to a certain extent.

The transport efficiency of the starch-based carrier material by M cells before and after the targeting peptide is grafted is shown as FIG. 6, and it can be seen from the figure that the transport efficiency of RGD-CMS2 (abbreviated as R-CMS2 in the figure) by M cells is increased by 1.05 times compared with that of the carboxymethyl starch obtained in the step (2).

Example 3

(1) An etherification reaction was carried out in a molar ratio of monochloro acetic acid to native starch (with a molecular weight of $1.0 \times 10^7$ g/mol) of 0.3 at 45° C. for 3 h, to prepare a carboxymethyl starch with a degree of substitution of carboxymethyl groups of 0.24;

(2) the carboxymethyl starch with the degree of substitution of carboxymethyl groups of 0.24 prepared in the step (1) was first subjected to pullulanase (with unit enzyme activity of 15 U/g (carboxymethyl starch in dry basis)) enzymolysis at 50° C. for 16 h, and then subjected to high-temperature resistant α-amylase (with unit enzyme activity of 100 U/g (carboxymethyl starch in dry basis)) enzymolysis at 80° C. for 10 min, to obtain a carboxymethyl starch (CMS3) with a molecular weight of $4.56 \times 10^5$ g/mol; and (3) an acylation reaction was carried out in a molar ratio of carboxymethyl groups to a catalyst to a GRGDS oligopeptide of 2:1:1 at 30° C. for 18 h, wherein the catalyst was a mixture of EDC and NHS (in a molar ratio of 1:1), the concentration of the carboxymethyl starch in the reaction system was 2% (w/v, g/mL), and a solvent was a phosphate buffer solution (0.1 M, pH=7.5). After the reaction was completed, the mixture was subjected to dialysis and freeze-drying to obtain a starch-based carrier material (RGD-CMS3) with a molecular weight of $4.58 \times 10^5$ g/mol, a degree of substitution of carboxymethyl groups of 0.25, and a grafting amount of the targeting peptide GRGDS of 0.71% (calculated based on the content of N element).

An infrared spectrogram and a proton nuclear magnetic resonance spectrogram of the starch-based carrier material (RGD-CMS3) prepared in the present example are respectively shown as FIG. 1 and FIG. 2. In the infrared spectrogram (FIG. 1) of RGD-CMS3, there appear two new absorption peaks respectively at 1730 cm$^{-1}$ and 1250 cm$^{-1}$, namely an absorption peak within the amide I band and an absorption peak within the amide III band, which proves that RGD-CMS3 has amido bonds. In the proton nuclear magnetic resonance spectrogram (FIG. 2) of RGD-CMS3, new chemical shifts respectively appear at 1.63 ppm, 2.84 ppm, and 3.56 ppm, and are respectively proton chemical shifts of methylene (—CH$_2$—) on arginine molecules, methine (—CH$_2$—CH(COOH)—CH$_2$—) on aspartic acid molecules, and methylene (—CH$_2$—) on glycine molecules, which proves that the RGD oligopeptide is successfully grafted onto CMS molecules.

RGD-CMS3 was negatively charged, hardly charged when protonated at pH (1.2) of the stomach, and had a ζ-potential of −27.3 mV when deprotonated at pH (6.8) of the small intestine (results are shown as FIG. 3).

After RGD-CMS3 was co-cultured with Caco-2 cells, survival rates of Caco-2 cells were all 95% or more at all experimental concentrations (10 to 100 µg/mL) (results are shown as FIG. 4), which proves that the starch-based carrier material is safe and non-toxic.

The starch-based carrier material RGD-CMS3 was co-cultured with Caco-2 cells and M cells in the cellular monomolecular layer on the upper side of the filter membrane at the bottom of the Transwell inserts. Results are shown as FIG. 5, D1 is cell nuclei (bright spots in the figure) of Caco-2 cells and M cells in the cellular monomolecular layer on the upper side of the filter membrane at the bottom of the Transwell inserts; D2 is M cells (labeled with specific antibodies of M cells and observed, bright spots in the figure) in the cellular monomolecular layer; D3 is the fluorescently-labeled starch-based carrier material RGD-CMS3 (bright spots in the figure); and D4 is a merged graph of each previous 3 graphs. It can be seen from D4 that fluorescent positions of the starch-based carrier material RGD-CMS3 and M cells in the cellular monomolecular layer on the upper side of the filter membrane at the bottom of the Transwell inserts are partially overlapped (in the figure, arrows 1 point to M cells, arrows 2 point to the fluorescently-labeled starch-based carrier material, and overlapping parts of M cells and the starch-based carrier material are marked with circles), which indicates that the starch-based carrier material RGD-CMS3 targets M cells to a certain extent.

The transport efficiency of the starch-based carrier material by M cells before and after the targeting peptide is grafted is shown as FIG. 6, and it can be seen from the figure that the transport efficiency of RGD-CMS3 (abbreviated as R-CMS3 in the figure) by M cells is increased by 2.1 times compared with that of the carboxymethyl starch obtained in the step (2).

Example 4

The starch-based carrier materials prepared in Examples 1 to 3 and target proteins (OVA) were respectively dissolved in phosphate buffer solutions (0.01 M, pH=3.0), to respectively formulate solutions at concentrations of 5 mg/mL and 2 mg/mL. A certain amount of starch-based carrier material solution was taken and poured into a beaker, a certain amount of OVA solution was slowly and dropwise added into the carrier solution by using a dropper in a mass ratio of the OVA to the starch-based carrier material of 1:2, the beaker was ceaselessly and gently shaken during the addition, and after the addition was completed, the mixed solution was fully mixed and stood still at 25° C. for 2 h. The assembled solution was centrifuged (at 10,000 r/min for 10 min), a supernatant was removed, and the precipitate was the target proteins encapsulated with the starch-based carrier material.

An encapsulation ratio was calculated as follows:

$$\text{Encapsulation ratio} = \frac{m_0 - m_1}{m_0} \times 100\%$$

wherein, $m_0$ is the total mass of OVA added into the system, and ml is the mass of OVA in the supernatant.

Figure 7:
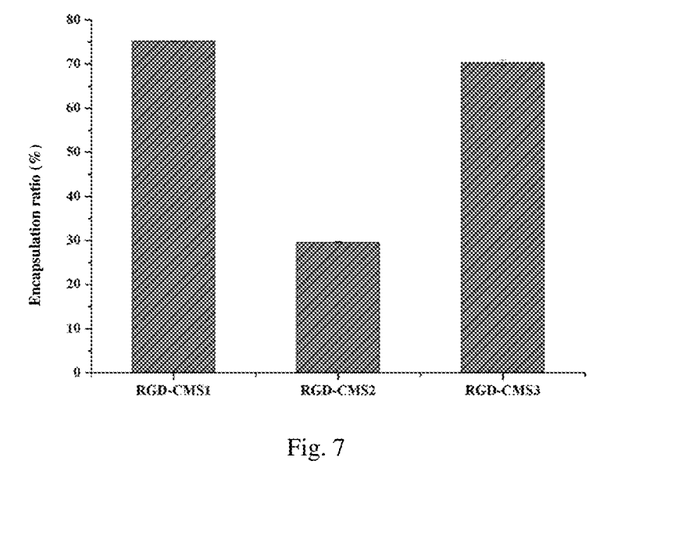
FIG. 7 is diagrams of encapsulation ratios of target proteins by the starch-based carrier materials prepared in Examples 1 to 3.

Encapsulation ratios of the target proteins by the starch-based carrier materials prepared in Examples 1 to 3 are shown as FIG. 7, and it can be seen from FIG. 7 that when the degree of substitution of carboxymethyl groups is higher, the encapsulation ratio of the target proteins by the starch-based carrier material is higher.

Figure 8:
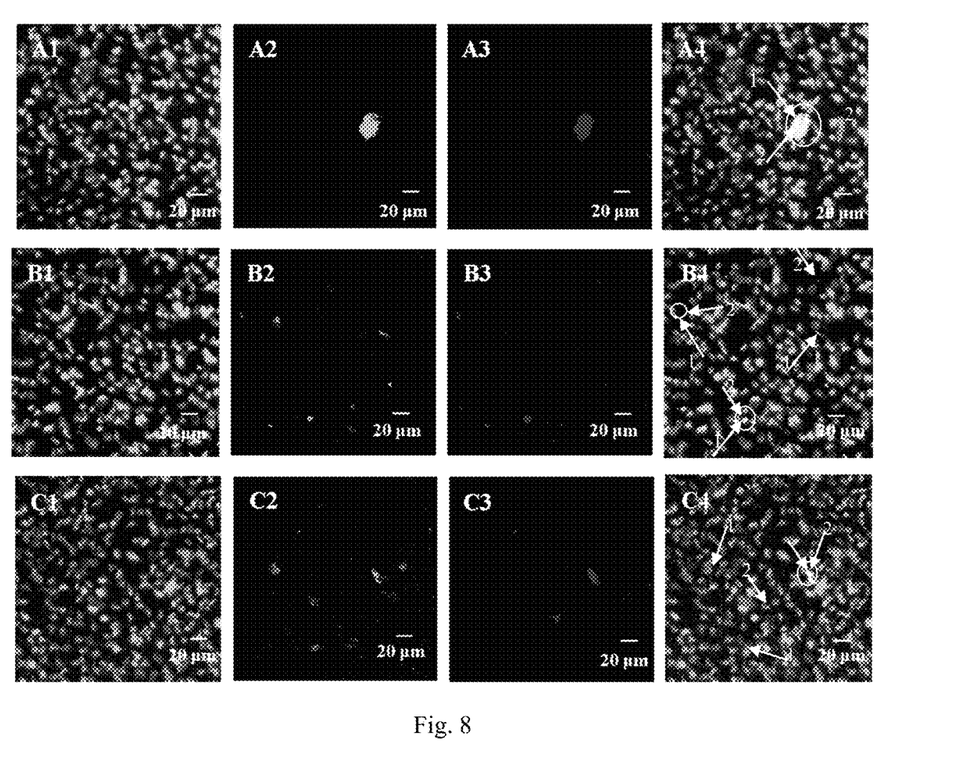
FIG. 8 is laser scanning confocal micrographs of assembled micro-capsules obtained by encapsulating OVA with the starch-based carrier materials prepared in Examples 1 to 3 and co-cultured with the cellular monomolecular layer composed of M cells and Caco-2 cells.

Assembled micro-capsules obtained by encapsulating OVA with the starch-based carrier materials prepared in Examples 1 to 3 were respectively co-cultured with Caco-2 cells and M cells in the cellular monomolecular layer on the upper side of the filter membrane at the bottom of the Transwell inserts. Laser scanning confocal micrographs are shown as FIG. 8, wherein A1 to C1 are cell nuclei (bright spots in the figures) of Caco-2 cells and M cells in the cellular monomolecular layer on the upper side of the filter membrane at the bottom of the Transwell inserts; A2 to C2 are M cells (labeled with specific antibodies of M cells and observed, bright spots in the figures) in the cellular monomolecular layer; A3 to C3 respectively are the assembled micro-capsules (bright spots) constructed by encapsulating OVA with the fluorescently-labeled starch-based carrier materials prepared in Examples 1 to 3; and A4 to C4 are respectively merged graphs of each previous 3 graphs. It can be seen from A4 to C4 that fluorescent positions of the assembled micro-capsules constructed by encapsulating OVA with the starch-based carrier materials and M cells in the cellular monomolecular layer on the upper side of the filter membrane at the bottom of the Transwell inserts are partially overlapped (in the figures, arrows 1 point to M cells, arrows 2 point to the fluorescently-labeled starch-based carrier materials, and overlapping parts of M cells and the starch-based carrier materials are marked with circles), and the overlapping parts are increased with increase of the grafting amount of the GRGDS peptide, which indicates that after encapsulating OVA, the starch-based carrier material targets M cells to a certain extent, and the grafting amount of GRGDS peptide affects M-cell targeting of the assembled micro-capsules constructed by encapsulating OVA with the starch-based carrier material.

Figure 9:
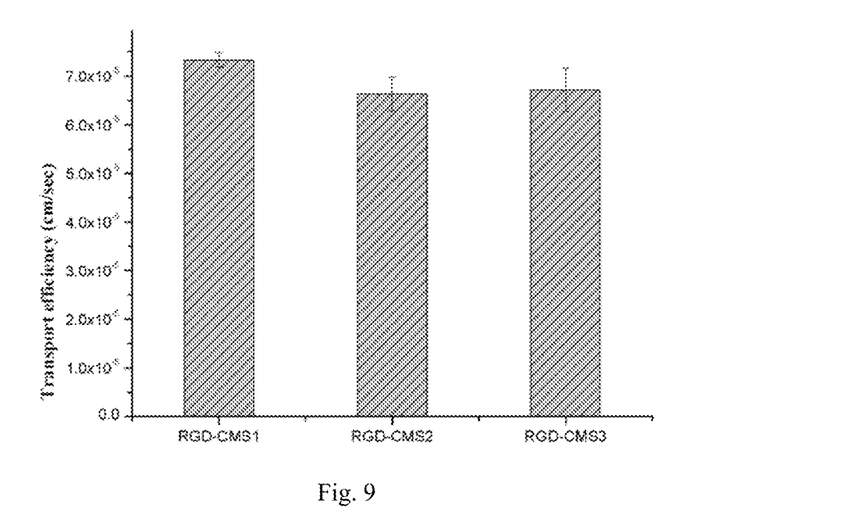
FIG. 9 is diagrams of the transport efficiency of the assembled micro-capsules obtained by encapsulating OVA with the starch-based carrier materials prepared in Examples 1 to 3 by M cells.

The transport efficiency of the assembled micro-capsules obtained by encapsulating OVA with the starch-based carrier materials prepared in Examples 1 to 3 by M cells is shown as FIG. 9, and results show that the transport efficiency of the assembled micro-capsules by M cells is higher.

According to detection, only 35.35%, 40.47%, and 43.80% of the target proteins (OVA) that were respectively encapsulated with the starch-based carrier materials prepared in Examples 1 to 3 were released in the stomach and the small intestine before reaching M cells.

The above examples are preferred embodiments of the present invention, but embodiments of the present invention are not limited thereto. Any other change, modification, substitution, combination, and simplification made without departing from the spirit and principle of the present invention shall be regarded as equivalent replacement modes and included within the scope of protection of the present invention.

The invention claimed is:

1. An M-cell targeting and pH-responsive starch-based carrier material, having a molecular structure as follows:

wherein the M-cell targeting and pH-responsive starch-based carrier material has a molecular weight of $7.04 \times 10^4$ to $2.11 \times 10^6$ g/mol, a degree of substitution of carboxymethyl groups of 0.04 to 0.28, and a grafting amount of a targeting peptide GRGDS of 0.01% to 1.12% based on the content of N; and that the Rs are H or $R_1$ or $R_2$ represents that in the molecular structure, a portion of R are H, a portion of R are $R_1$, and a portion of R are $R_2$.

2. A preparation method of the M-cell targeting and pH-responsive starch-based carrier material according to claim 1, characterized in that, it comprises the following steps:

(1) taking a starch as a raw material to prepare a carboxymethyl starch by means of an etherification reaction with monochloro acetic acid; and (2) taking the carboxymethyl starch as a raw material, grafting a GRGDS oligopeptide onto the molecular chain of the carboxymethyl starch by means of an acylation reaction, removing unreacted catalyst and oligopeptide by means of dialysis after the reaction is completed, and performing freeze-drying, to obtain a starch-based carrier material having a M-cell targeting function.

3. The preparation method of the M-cell targeting and pH-responsive starch-based carrier material according to claim 2, characterized in that:

after the reaction of the step (1) is completed, the carboxymethyl starch is subjected to enzymolysis, enzyme denaturalization, and freeze-drying, and then used as the raw material for the acylation reaction of the step (2).

4. The preparation method of the M-cell targeting and pH-responsive starch-based carrier material according to claim 3, characterized in that:

the enzymolysis represents that the carboxymethyl starch is first subjected to pullulanase enzymolysis, and then subjected to high-temperature stable α-amylase enzymolysis, wherein the pullulanase enzymolysis is carried out at a unit enzyme activity of 15 U/g and 50° C. for 16 to 24 h; and the high-temperature stable α-amylase enzymolysis is carried out at a unit enzyme activity of 100 U/g and 80° C. for 10 to 30 min.

5. The preparation method of the M-cell targeting and pH-responsive starch-based carrier material according to claim 2, characterized in that:

in the step (1), the molecular weight of the starch is $1.0 \times 10^6$ to $1.0 \times 10^7$ g/mol;

in the step (1), the etherification reaction is carried out at 40 to 50° C. for 2 to 4 h; and in the step (1), a molar ratio of the starch to the monochloro acetic acid is 1:(0.1-0.4).

6. The preparation method of the M-cell targeting and pH-responsive starch-based carrier material according to claim 2, characterized in that:

in the step (2), the degree of substitution of carboxymethyl groups is 0.04 to 0.27.

7. The preparation method of the M-cell targeting and pH-responsive starch-based carrier material according to claim 2, characterized in that:

in the step (2), the acylation reaction is carried out at 25 to 35° C. for 12 to 24 h in the presence of a catalyst, and the catalyst is a mixture of 1-ethyl-(3-dimethylaminopropyl) carbodiimide and N-hydroxy succinimide.

8. The preparation method of the M-cell targeting and pH-responsive starch-based carrier material according to claim 7, characterized in that:

in the step (2), usage amounts of the carboxymethyl starch, the catalyst, and the GRGDS oligopeptide satisfy the following conditions: calculated based on a molar weight, a ratio of the carboxymethyl groups to the catalyst to the GRGDS oligopeptide is (1:1:1) to (4:1:1), and in the catalyst, a molar ratio of the 1-ethyl-(3-dimethylaminopropyl) carbodiimide to the N-hydroxy succinimide is 1:1; and in the step (2), a concentration of the carboxymethyl starch in the acylation reaction system satisfies the condition that each 100 mL of the acylation reaction system contains 0.5 to 2 g of sodium carboxymethyl starch.

9. The M-cell targeting and pH-responsive starch-based carrier material according to claim 1 formulated for oral delivery.

10. The M-cell targeting and pH-responsive starch-based carrier material formulated for oral delivery according to claim 9, further comprising an active substance that is a positively charged immunoreactive substance.

* * * * *